US010464081B2

(12) United States Patent
Wang

(10) Patent No.: US 10,464,081 B2
(45) Date of Patent: Nov. 5, 2019

(54) LOW-FLOW EMITTER

(71) Applicant: ARIA PRODUCTS L.L.C., Dover, DE (US)

(72) Inventor: Daniel Chun Wang, Chung Hua Hsien (TW)

(73) Assignee: Aria Products L.L.C., Dover, DE (US)

( * ) Notice: Subject to any disclaimer, the term of this patent is extended or adjusted under 35 U.S.C. 154(b) by 103 days.

(21) Appl. No.: 15/195,025

(22) Filed: Jun. 28, 2016

(65) Prior Publication Data
US 2017/0367275 A1 Dec. 28, 2017

(51) Int. Cl.
*B05B 1/30* (2006.01)
*A01G 25/02* (2006.01)

(52) U.S. Cl.
CPC .......... *B05B 1/3033* (2013.01); *A01G 25/023* (2013.01)

(58) Field of Classification Search
CPC ................ A01G 25/02; A01G 25/023; A01G 2025/006; B05B 1/02; B05B 1/30; B05B 1/3033; B05B 1/32
USPC ....................................................... 239/542
See application file for complete search history.

(56) References Cited

U.S. PATENT DOCUMENTS

| | | | | |
|---|---|---|---|---|
| 982,106 A * | 1/1911 | Thornycroft | ......... | B05B 1/3033 239/457 |
| 1,108,728 A * | 8/1914 | Ewing | ................... | B05B 1/3033 239/485 |
| 2,723,879 A * | 11/1955 | Martin | .................... | B05B 1/265 239/193 |
| 2,783,094 A | 2/1957 | Storie | | |
| 4,044,991 A * | 8/1977 | Waller | .................... | F16K 47/06 138/43 |
| 4,722,481 A * | 2/1988 | Lemkin | ................ | A01G 25/023 137/513.5 |
| 2005/0224737 A1 | 10/2005 | Mihaylov et al. | | |

FOREIGN PATENT DOCUMENTS

| | | |
|---|---|---|
| CN | 202238389 | 5/2012 |
| FR | 885826 A | 9/1943 |

* cited by examiner

*Primary Examiner* — Cody J Lieuwen
(74) *Attorney, Agent, or Firm* — Muncy, Geissler, Olds & Lowe, P.C.

(57) ABSTRACT

A low-flow emitter includes a first housing and a second housing. The first housing includes a first thread portion, and a first passage defined in the first thread portion. The second housing includes a second thread portion, and a second passage defined in the second thread portion corresponding with the first thread portion in a thread connection. Part of the thread connection between the first and second housings is a loose fitting thread connection. A spiral passage is formed along the loose fitting thread connection between the first and second housings. Water flow rate is able to be controlled by a rotation of the first housing with respect to the second housing.

4 Claims, 13 Drawing Sheets

LOW-FLOW EMITTER

BACKGROUND OF THE INVENTION

1. Field of the Invention

The present invention relates to a drip emitter, specifically to a low-flow emitter which offers precise control of water flow rate.

2. Description of the Related Art

In low-flow irrigation, sometimes known as micro-irrigation, water is delivered to the irrigation area at low and uniform flow rate, thereby conserving water.

For low-flow emitter, a typical method of flow rate adjustment is controlling the size of an opening through which water passes through to the emitter nozzle. For example, China Publication No "CN202238389" discloses a drip hole formed on a thread emitter core. An emitter sleeve shadowing the drip hole reduces the flow rate. The flow rate can be controlled by the relative overlapping between the emitter sleeve and the drip hole. However, the position of the emitter sleeve is difficult to control precisely.

In the interest of water conservation, a low-flow emitter having precise adjustment control of flow rate is desired.

SUMMARY OF THE INVENTION

It is therefore one or more aspects to a low-flow emitter with simple structure and convenient manipulation, and the low-flow emitter offers precise flow rate adjustment.

For one or more aspects of the present invention, a low-flow emitter is disclosed. The low-flow emitter includes a first housing, a second housing, and a spiral passage. The first housing includes a first thread portion, and a first passage formed coaxially with the first thread portion. The first thread portion includes a first thread section. The second housing includes a second thread portion, and a second passage formed coaxially with the second thread portion. The second thread portion includes a third thread section corresponding with the first thread section of the first thread portion of the first housing. The spiral passage is defined between the third thread section of the second thread portion of the second housing and the first thread section of the first thread portion of the first housing, and is communicated with the first and second passages.

For one or more aspects of the present invention, a low-flow emitter is disclosed. The low-flow emitter includes a first housing, a second housing, and a spiral passage. The first housing includes a first thread portion, and a first passage formed coaxially defined in with the first thread portion; the first thread portion including a first thread section. The second housing includes a second thread portion, and a second passage formed coaxially with defined in the second thread portion; the second thread portion including a third thread section corresponding with the first thread section of the first thread portion of the first housing. The spiral passage is defined between the third thread section of the second thread portion of the second housing and the first thread section of the first thread portion of the first housing, and communicated with the first and second passages.

In one comprehension of the present invention, the spiral passage of the low-flow emitter will restrain the water flow from the second passage to the first passage, in order to hold the water pressure and realize steady water dispensing. On the other hand, the first and second thread portions are defined a diameter being tapered off, and dimensions of the spiral passage could be adjusted by operating a relative rotation between the first and second housings.

Other advantages and features of the present invention will be fully understood by reference to the following specification in conjunction with the accompanying drawings, in which like reference signs denote like components of structure.

DETAILED DESCRIPTION OF THE INVENTION

The present invention relates to a low-flow emitter 10 (10a~10c). The low-flow emitter 10 includes a first housing 20 (20a~20c), a second housing 30 (30a~30c), and a spiral passage 12 (12a, 12b). The low-flow emitter 10 (10a~10c) according to the embodiments of the present invention will be described with reference to the drawings. Repeated description thereof may be omitted.

First Embodiment

FIGS. 1 through 4 pertain to a first embodiment of the invention.

Figure 1:
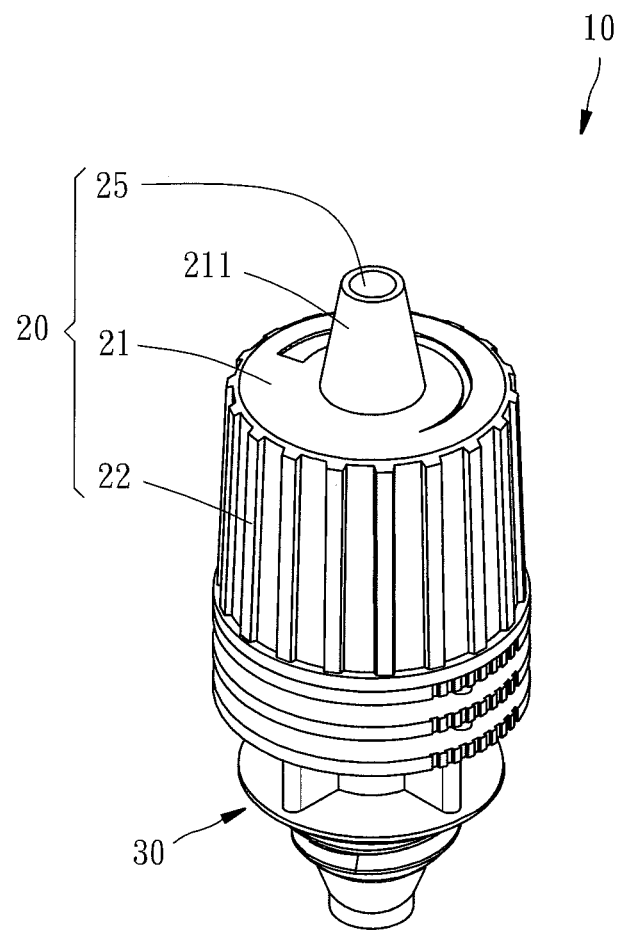
FIG. 1 is a perspective view showing a low-flow emitter in accordance to a first embodiment of the present invention.
Figure 3:
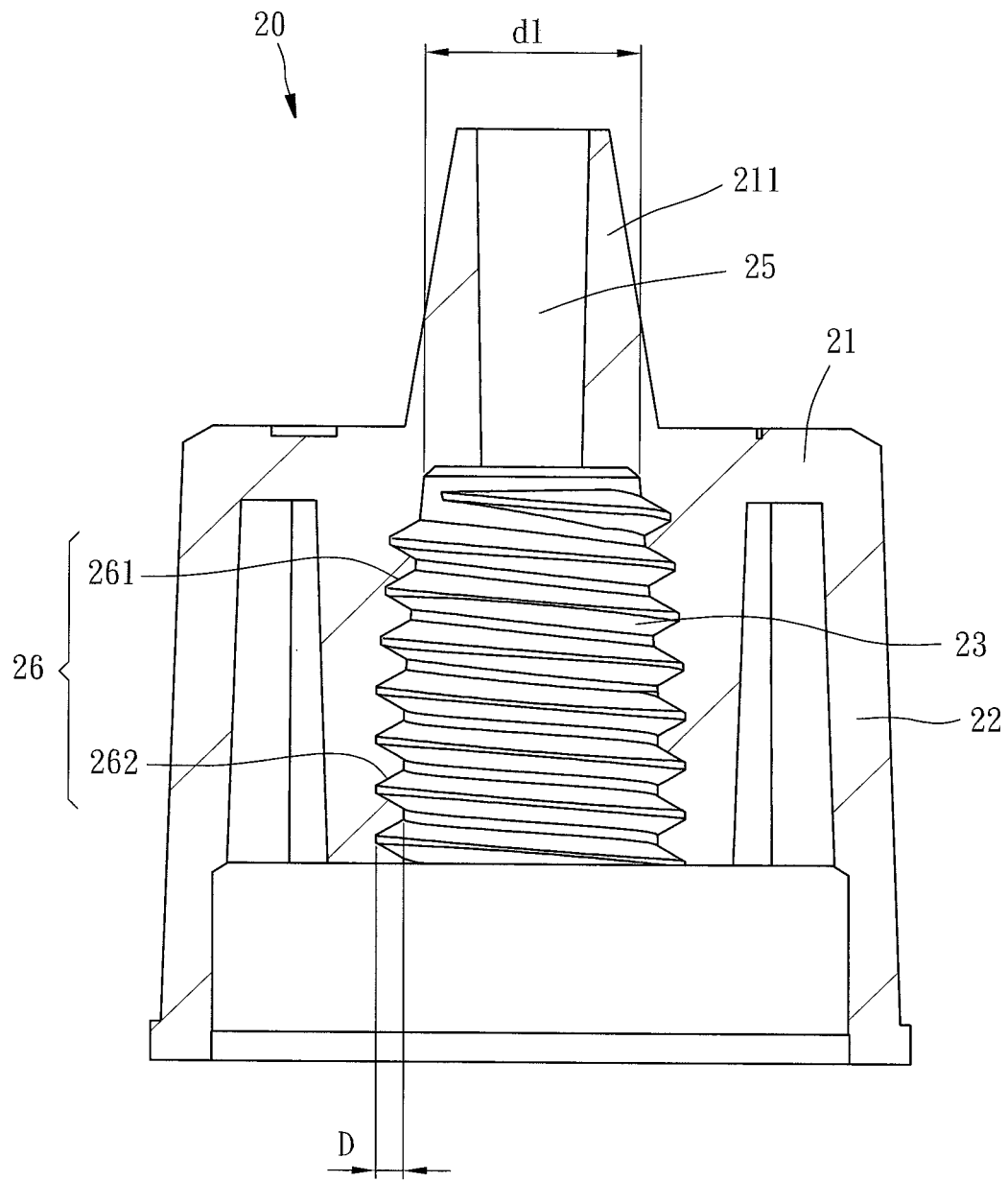
FIG. 3. is a cross-sectional profile showing a first housing in accordance to FIG. 1.

The first housing 20, referring to FIGS. 1 and 3, includes an end member 21, a circumference member 22, a tubular head 211, a first passage 25, an exterior thread bore 23, and a first thread portion 26. A top of the circumference member 22 borders a periphery of the end member 21. The tubular head 211 extends from an exterior face of the end member 21. The first passage 25 is coaxially formed in the tubular head 211. The exterior thread bore 23 is formed from an interior face of the end member 21, and coaxially corresponds with the tubular head 211. The first thread portion 26 is formed in the exterior thread bore 23.

The first thread portion 26 includes a first thread section 261 and a second thread section 262 connected with each other. The first thread section 261 defines a major diameter d1 which increases gradually in a direction away from the first passage 25. Therefore, the first thread section 261 is tapered off. The second thread section 262 is generally straight. A distance from the first thread section 261 to the first passage 25 is less than that from the second thread section 262 to the first passage 25. Each of the first and the second thread sections 261, 262 defines a root with a thread depth D, and the thread depth of the first thread section 261 equals to that of the second thread section 262.

Figure 2:
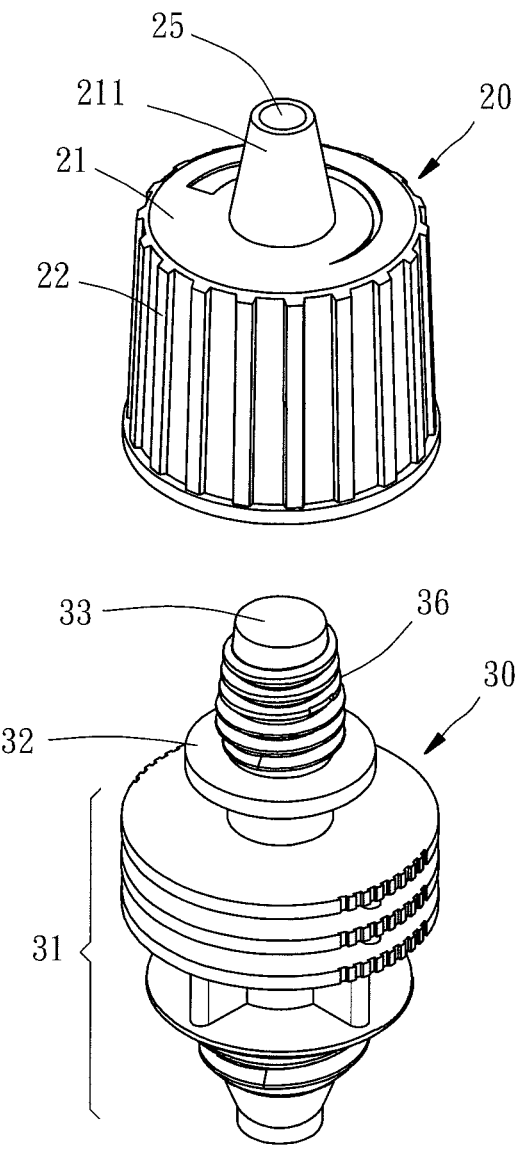
FIG. 2. is an explosion in accordance to FIG. 1.
Figure 4:
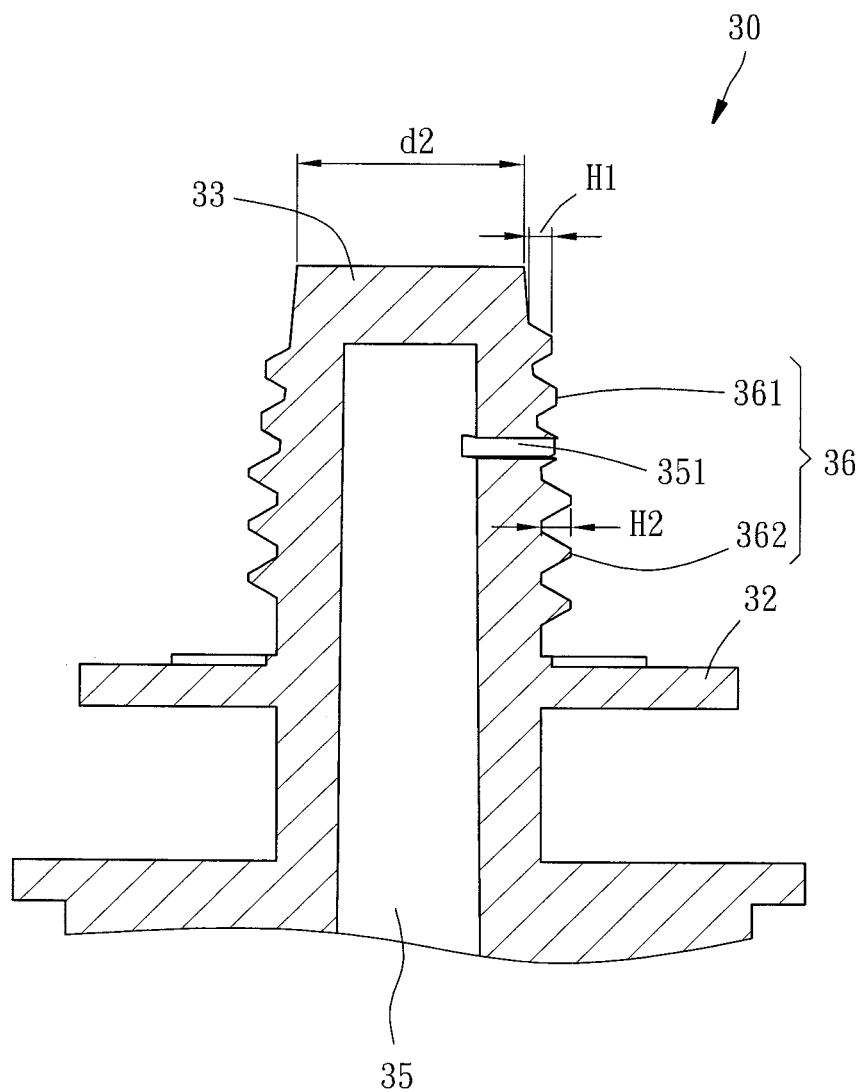
FIG. 4 is a cross-sectional profile showing a second housing in accordance to FIG. 1.

The second housing 30, referring to FIGS. 2 and 4, includes a connection base 31, a flange 32, an exterior thread axle 33, a second passage 35, an orifice 351, and a second thread portion 36. The connection base 31 is adapted for connecting with an irrigation pipe (not illustrated). The flange 32 connects to a top of the connection base 31. The second passage 35 is coaxially formed on the second housing 30 and extends from a bottom end of the connection base 31. The second passage 35 communicates outwardly via the orifice 351. The exterior thread axle 33 extends from the flange 32 in a direction away from the flange 32. The second thread portion 36 is formed on an exterior periphery of the thread axle 33. The orifice 351 is radially formed on the exterior thread axle 33

The second thread portion 36 includes a third thread section 361 and a fourth thread section 362 connected with each other. The third thread section 361 defines a minor diameter which gradually reduces in a direction away from the flange 32, which means it also gradually increases in a direction away from the first passage 25. Therefore, the third thread section 361 tapers off. The third thread section 361 of the second thread portion 36 corresponds to the first thread section 261 of the first thread portion 26; the fourth thread section 362 of the second thread portion 36 corresponds to the second thread section 262 of the first thread portion 26. A distance from the third thread section 361 to the flange 32 is greater than that from the fourth thread section 362 to the flange 32. Each of the third and the fourth thread sections 361, 362 defines a crest with a height, and the crest height H1 of the third thread section 361 is less than the crest height H2 of the fourth thread section 362. The crest height H2 of the fourth thread section 362 generally equals to the thread depth D of the second thread section 262 of the first housing 20. The crest height H1 of the third thread section 361 is less than the thread depth D of the first thread section 261 of the first housing 20.

Figure 5:
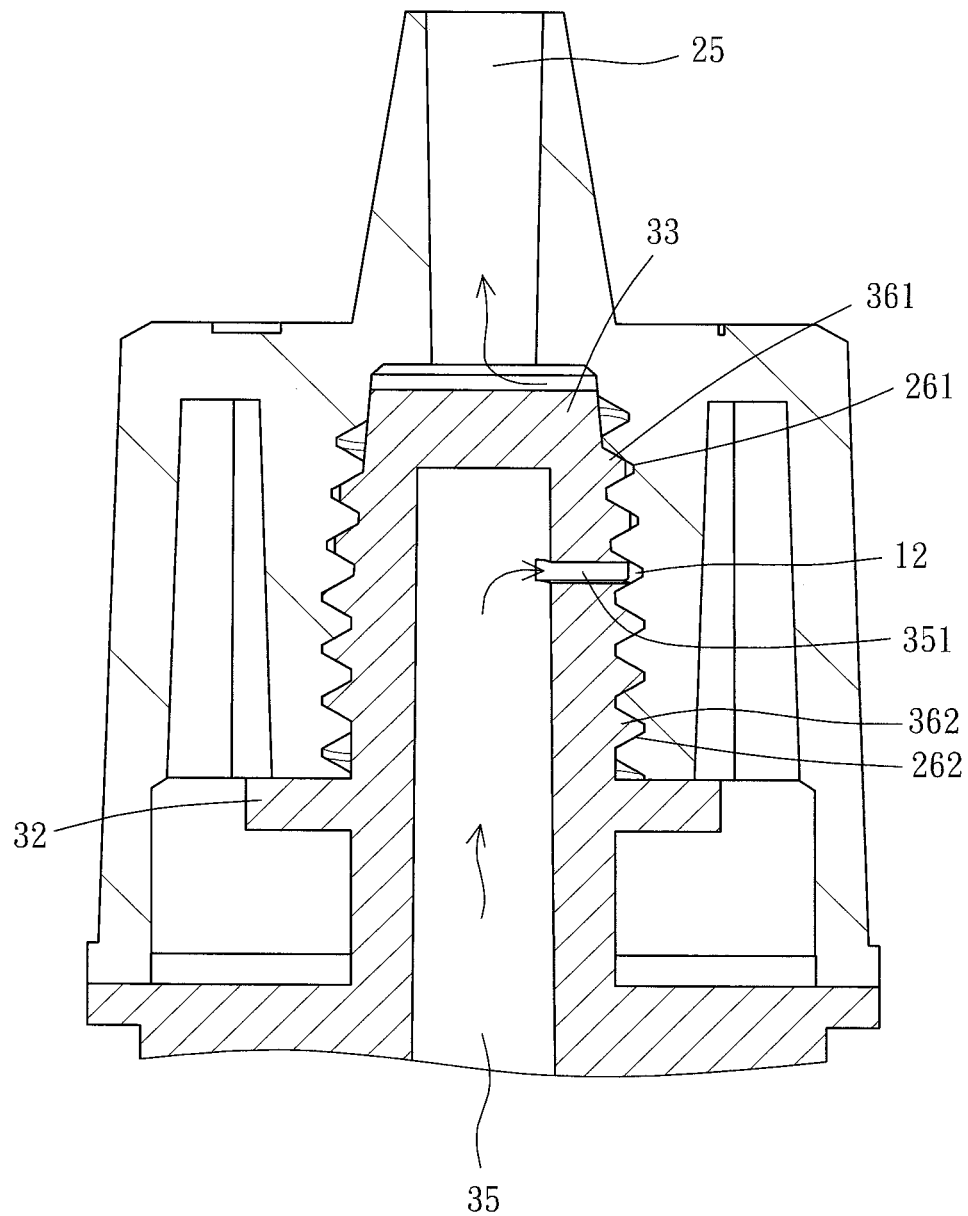
FIG. 5 is a cross-sectional profile in accordance to FIG. 1.

During assembly, referring to FIG. 5, the second thread portion 36 engages the first thread portion 26 to enable the second housing 30 connect the first housing 20 until the flange 32 of the second housing 30 retains against an end of the exterior thread bore 23. After completion of the assembly, the third thread section 361 of the second housing 30 engages the first thread section 261 of the first housing 20 while the fourth thread section 362 of the second housing 30 engages the second thread section 262 of the first housing 20.

The spiral passage 12 is formed between the crest of the third thread section 361 and the root of the first thread section 261 due to the crest height H1 of the third thread section 361 being less than the thread depth D of the first thread section 261. An end of the spiral passage 12 communicates with the first passage 25 of the first housing 20. An opposite end of the spiral passage 12 communicates with the second passage 35 of the second housing 30 via the orifice 351. The water flows from the second passage 35 through the orifice 351 to the spiral passage 12, and then enters the first passage 25 for water distribution.

The first thread portion 26 of the first housing 20 and the second thread portion 36 of the second housing 30 are tapered off. Dimensions of the spiral passage 12 are able to adjust by a rotation of the first housing 20. During the adjustment rotation, the fourth thread section 362 of the second thread portion 36 of the second housing 30 rotates while also tightly engaging the second thread section 262 of the first thread portion 26 of the first housing 20, thereby preventing disengagement between the first and second housings 20, 30.

In an alternative embodiment (not illustrated), the crest height the first thread section 261 of the first housing 20 is less than the thread depth of the third thread section 361 of the second housing 30, and the spiral passage 12 is formed between the crest of the first thread section of the first housing and the root of the third thread section of the second housing.

In an alternative embodiment (not illustrated), the first and second housings 20, 30 are assembled in a reverse manner in that the first housing 20 connects the water source while the second housing 30 offers water dispensing. In this case, the water flows from the first passage 25 into the spiral passage 12, and then goes into the second passage 35 through the orifice 351 for water dispensing.

In an alternative embodiment (not illustrated), a distance from the first thread section 261 to the first passage 25 is greater than that from the second thread section 262 to the first passage 25. A distance from the third thread section 361 to the flange 32 is smaller than that from the fourth thread section 362 to the flange 32. An optional water sealing member is disposed on the flange. Upon assembly, the water sealing member presses against an interior wall of the circumference member.

Second Embodiment

Figure 6:
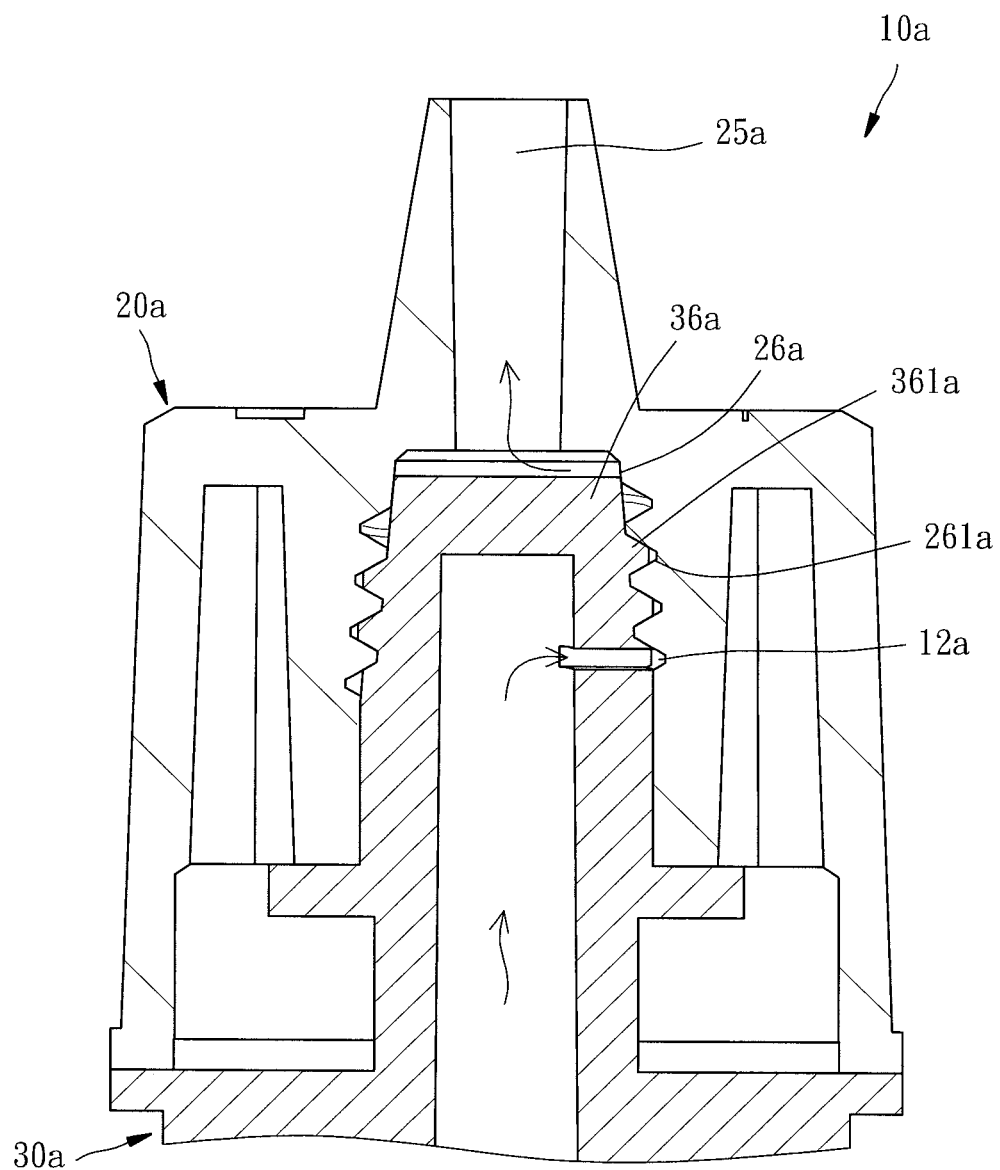
FIG. 6 is a cross-sectional profile showing the low-flow emitter in accordance to a second embodiment of the present invention.

FIG. 6 pertains to a low-flow emitter 10a according to a second embodiment of the invention, which is similar to the first embodiment in that the first housing 20a includes a first thread portion 26a having a first thread section 261a, the second housing 30a includes a second thread portion 36a having a third thread section 361a, and a spiral passage 12a is formed between the first and third thread sections 261a, 361a.

The low-flow emitter is specially adapted for hanging irrigation where water flows through a first passage 25a in a downward manner. It should be comprehended that the second and fourth thread sections are omitted in the case.

Third Embodiment

FIGS. 7 to 11 pertain to a third embodiment of the invention. A low-flow emitter 10b includes a first housing 20b, a second housing 30b, and a spiral passage 12b.

Figure 7:
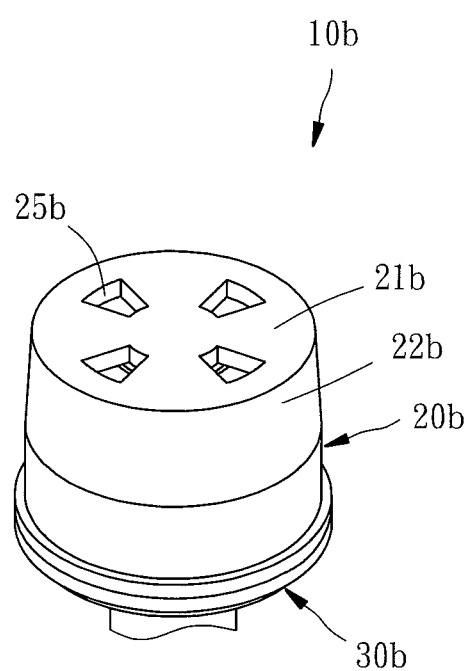
FIG. 7 is a perspective view showing the low-flow emitter in accordance to a third embodiment of the present invention.
Figure 8:
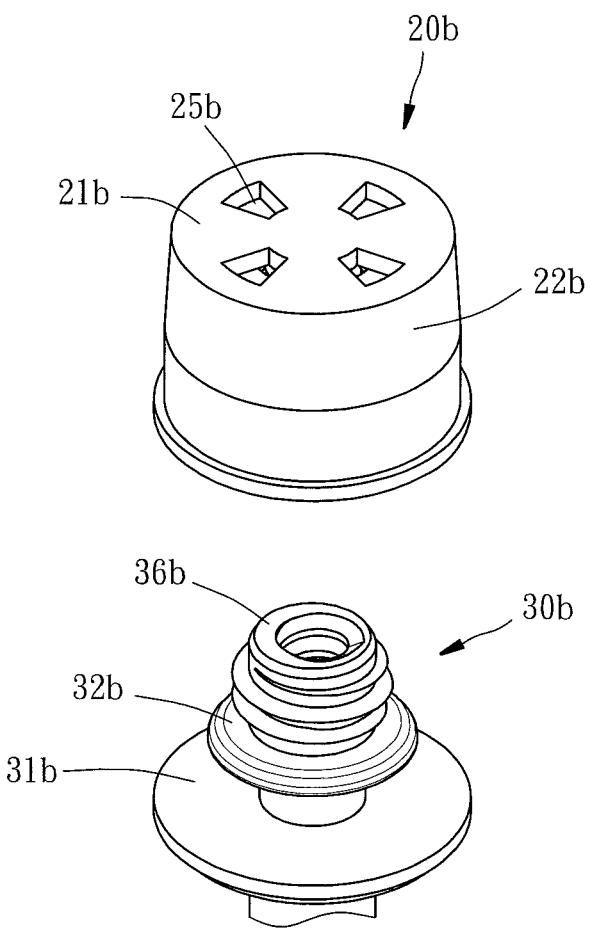
FIG. 8 is an explosion in accordance to FIG. 7.
Figure 9:
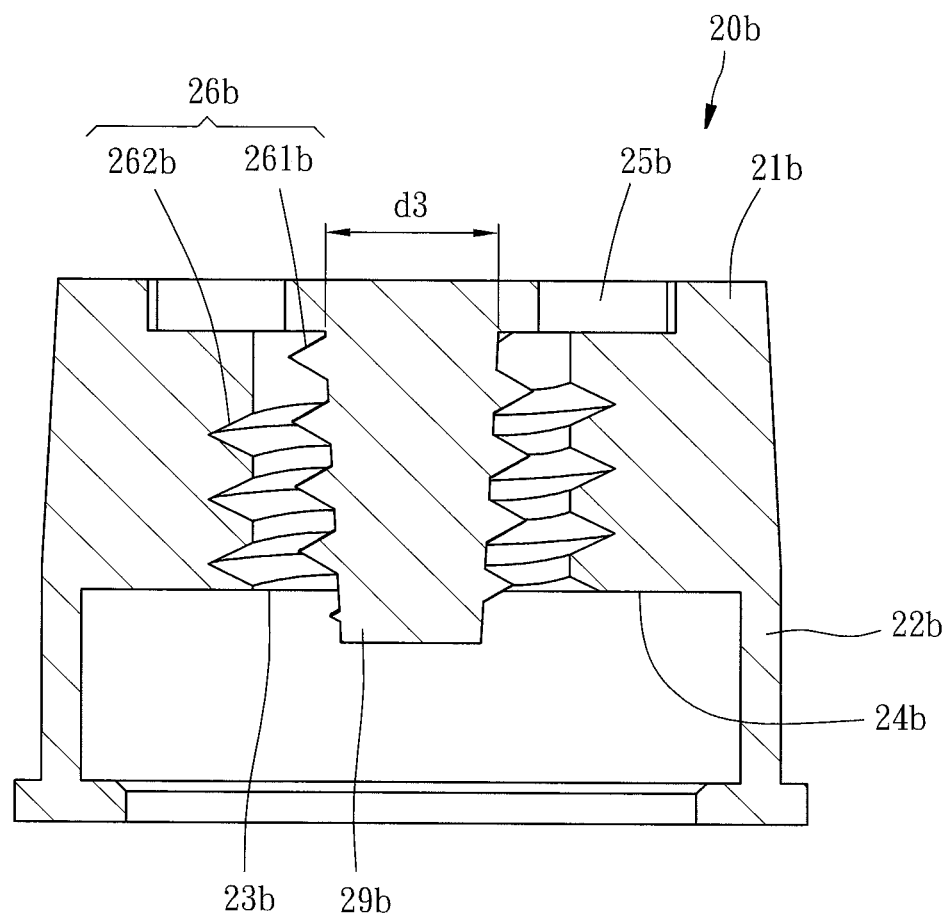
FIG. 9 is a cross-sectional profile showing a first housing in accordance to FIG. 7.

The first housing 20b, referring FIGS. 7 to 9, includes an end member 21b, a circumference member 22b, an abutting face 24b, four first passages 25b, an exterior thread bore 23b an interior thread axle 29b, and a first thread portion 26b. A top of the circumference member 22b borders a periphery of the end member 21b. The abutting face 24b is formed from an interior face of the end member 21b and adjacent to the circumference member 22b. The four first passages 25b are formed on the end member 21b. The exterior thread bore 23b extends from an interior face of the end member 21b. The interior thread axle 29b is coaxially arranged through the exterior thread bore 23b.

The first thread portion 26b includes a first thread section 261b and a second thread section 262b. The first thread section 261b is arranged on the interior thread axle 29b, and the second thread section 262b is coaxially arranged on the exterior thread bore 23b. The first thread section 261b defines a minor diameter d3 which gradually reduces in a direction away from the first passages 25b. Therefore, the first thread section 261b is tapered off.

Figure 10:
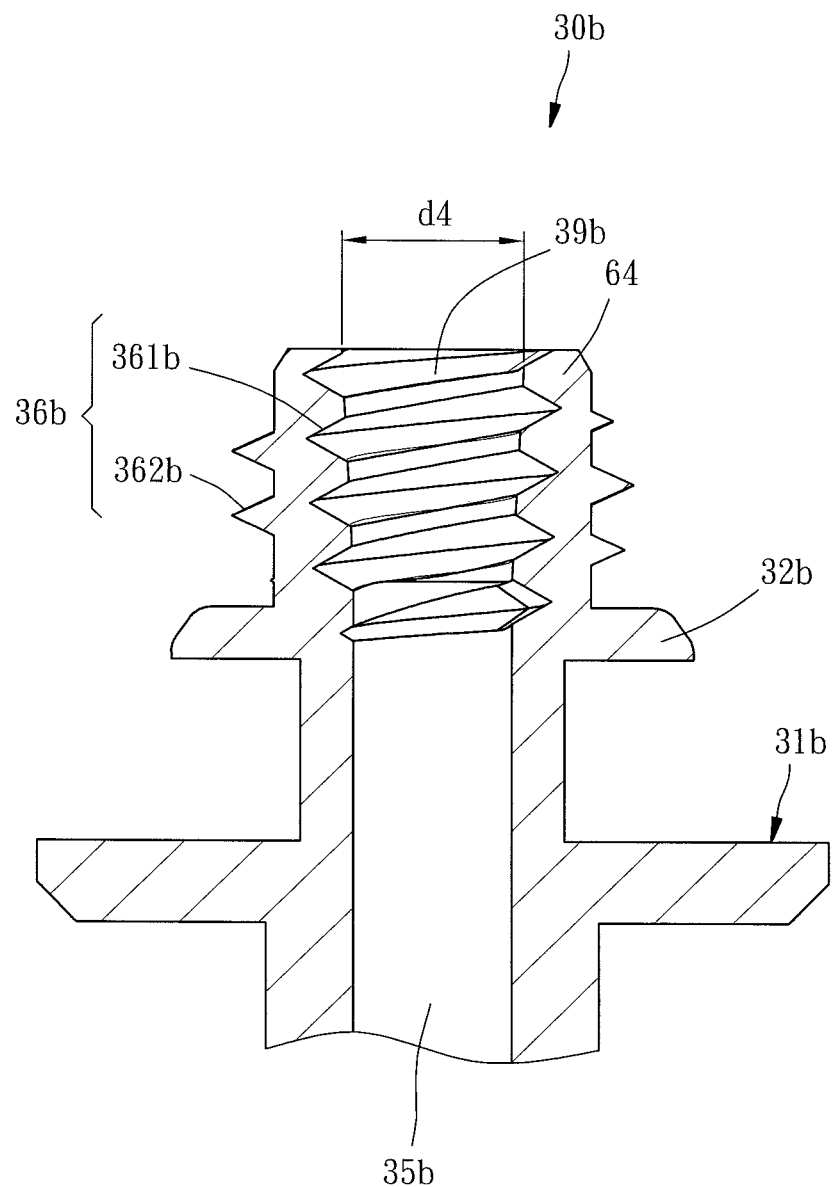
FIG. 10 is a cross-sectional profile showing a second housing in accordance to FIG. 7.

The second housing 30b, referring FIGS. 8 and 10, includes a connection base 31b, a flange 32b, a second passage 35b, an interior thread bore 39b, an exterior thread axle 64, and a second thread portion 36b. The connection base 31b is adapted for connecting with an irrigation pipe (not illustrated). The flange 32b connects to a top of the connection base 31b. The second passage 35b is coaxially formed on the second housing 30b and extends from an end of the connection base 31b. The interior thread bore 39b is coaxially formed in the exterior thread axle 64, and extends from an opposite end of the connection base 31b and toward the flange 32b to communicate with the second passage 35b.

The second thread portion 36b includes a third thread section 361b and a fourth thread section 362b. The third thread section 361b is arranged on the interior thread bore 39b. The fourth thread section 362b is coaxially arranged on the exterior thread axle 64 and extends from the flange 32b. The third thread section 361b defines an diameter d4 which gradually increases in a direction away from the flange 32b, which means it also gradually reduces in a direction away from the first passage 25b. Therefore, the third thread section 361b is tapered off.

Figure 11:
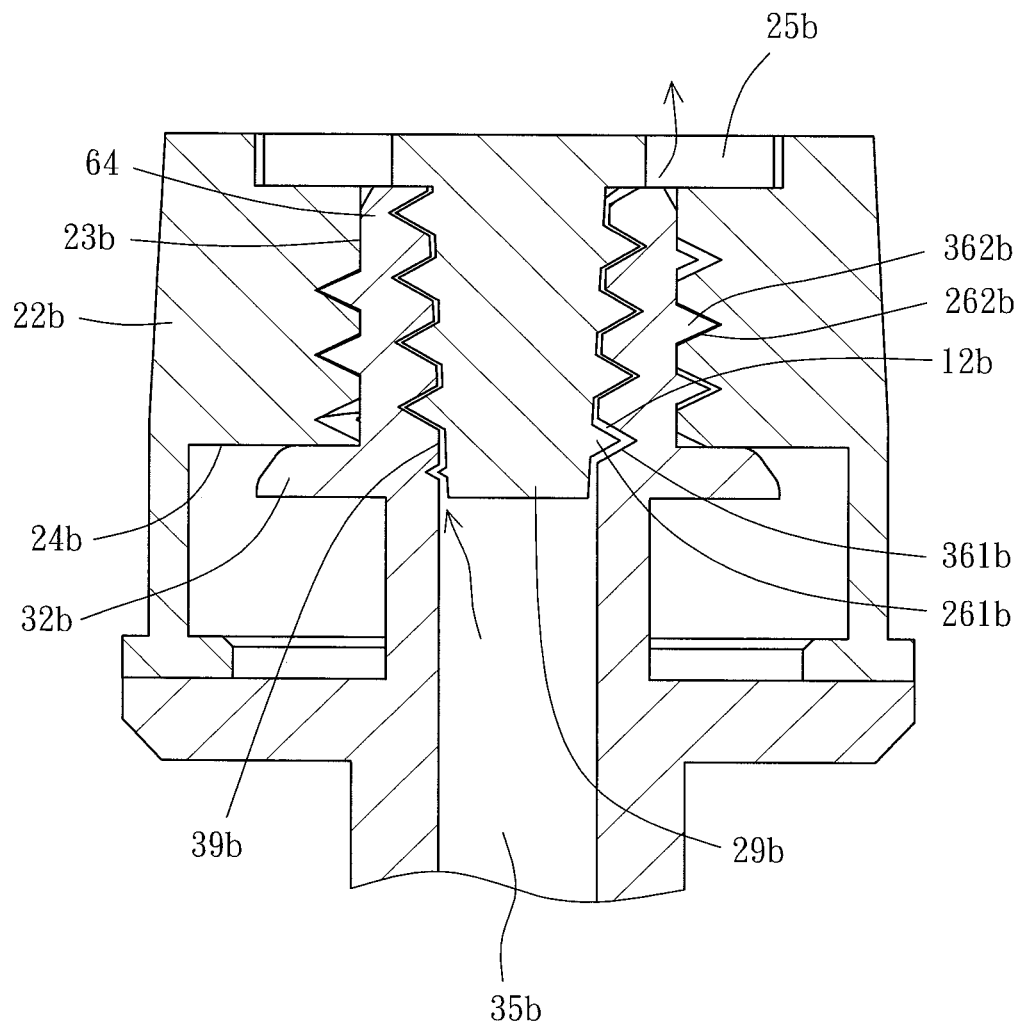
FIG. 11 is a cross-sectional profile in accordance to FIG. 7.

During assembly, referring to FIG. 11, the second thread portion 36b engages with the first thread portion 26b to enable the second housing 30b connect the first housing 20b until the flange 32b of the second housing 30b retains against the abutting face 24b, where an end of the interior thread bore 39b stops. After completion of the assembly, the third thread section 361b of the second housing 30b engages the first thread section 261b of the first housing 20b while the fourth thread section 362b of the second housing 30b engages the second thread section 262b of the first housing 20b. A predetermined gap is formed between the third thread section 361b and the first thread section 261b.

The spiral passage 12b is formed between the third thread section 361b and the first thread section 261b due to the predetermined gap. An end of the spiral passage 12b communicates with the first passage 25b of the first housing 20b. An opposite end of the spiral passage 12b communicates with the second passage 35b of the second housing 30b. Therefore, the water flows from the second passage 35b to the spiral passage 12b, and then goes into the first passage 25b for water distribution.

The first thread section 261b of the first housing 20b and the third thread section 361b of the second housing 30b are tapered off. Dimensions of the spiral passage 12b is able to adjust by a rotation of the first housing 20b without disengagement between the first and second housings 20b and 30b.

Fourth Embodiment

Figure 12:
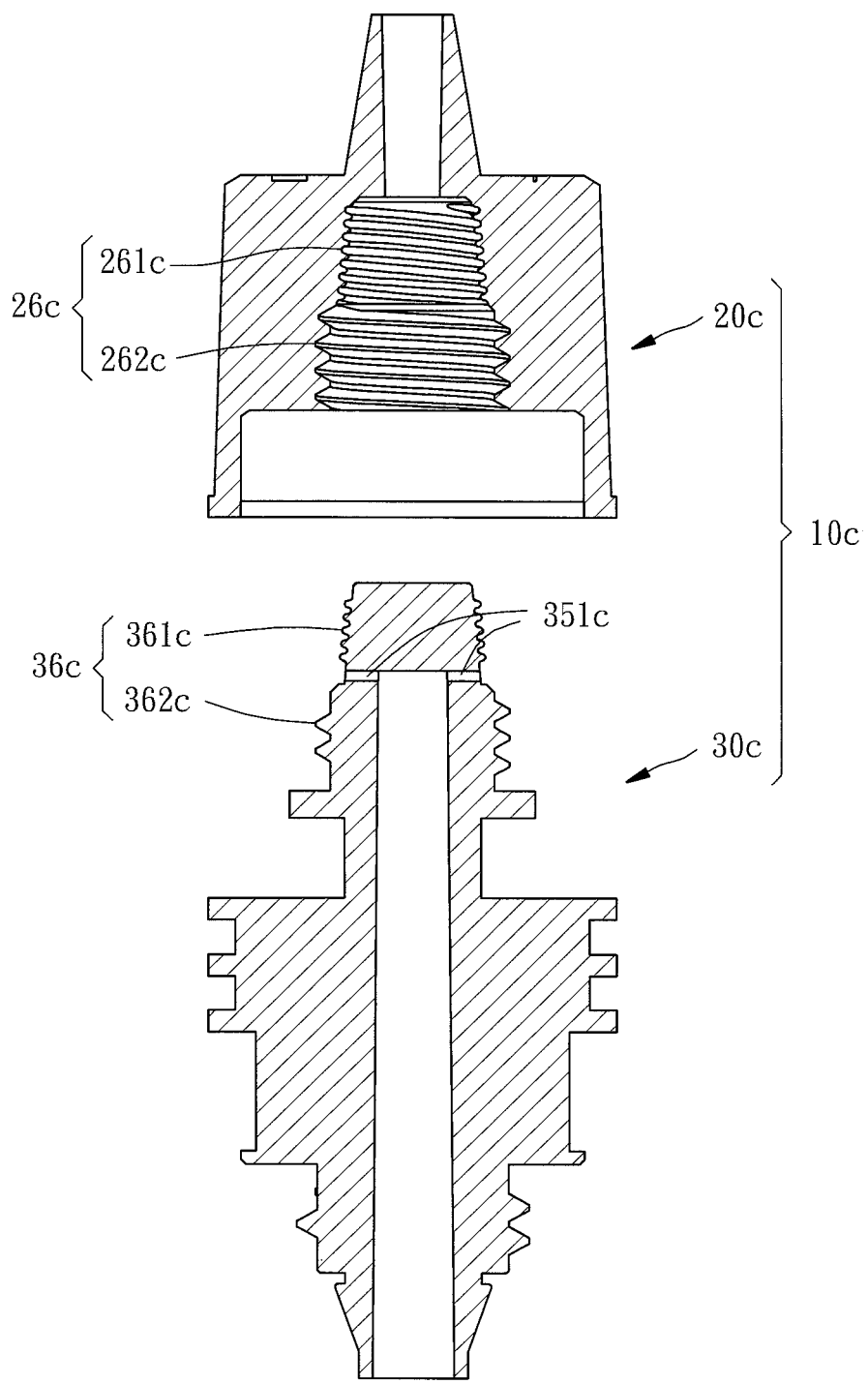
FIG. 12 is a cross-sectional profile showing an explosion of the low-flow emitter in accordance to a fourth embodiment of the present invention.
Figure 13:
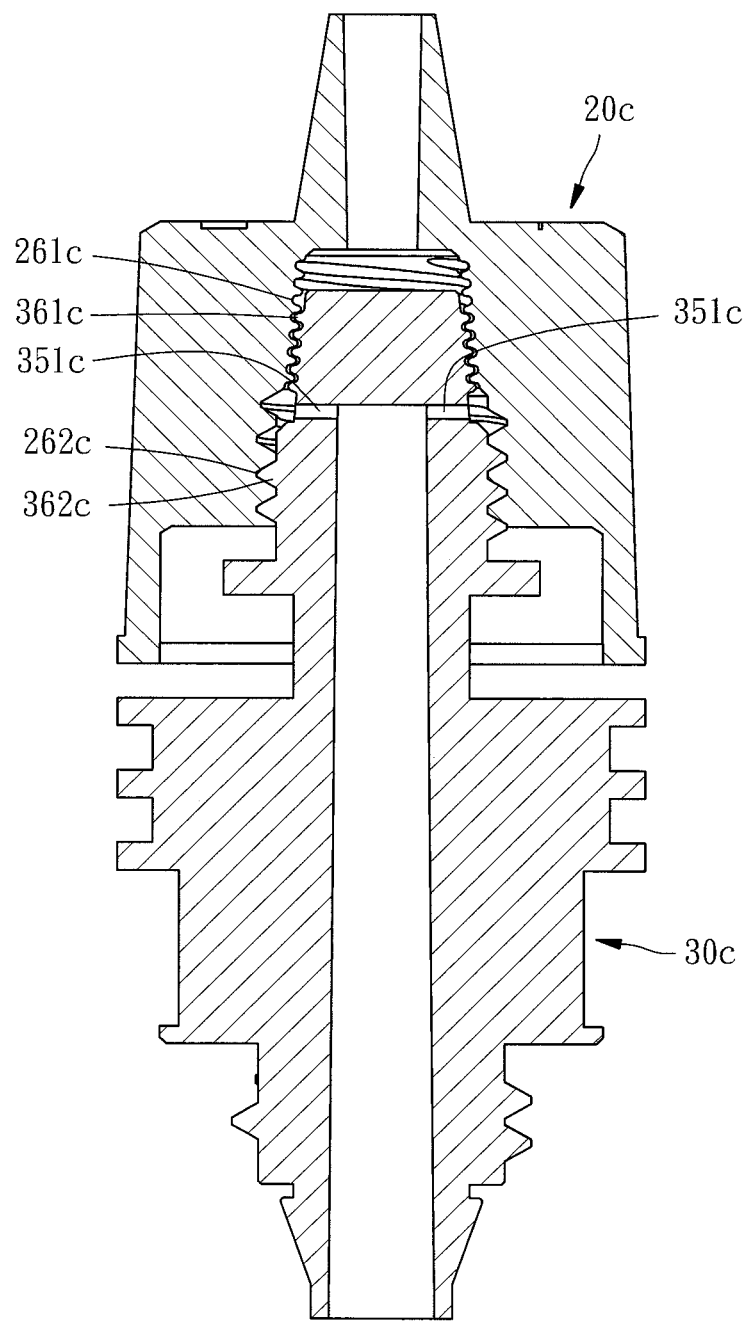
FIG. 13 is a cross-sectional profile in accordance to FIG. 12.

FIGS. 12 to 13 pertain to a low-flow emitter 10c according to a fourth embodiment of the invention, which is similar to the first embodiment in that the first housing 20c includes a first thread portion 26c, the second housing 30c includes a second thread portion 36c, and a spiral passage is formed between the first thread portion and the second thread portion.

A first thread section 261c and a second thread section 262c are formed on a first thread portion 26c of the first housing 20c and are connected with each other; a third thread section 361c and a fourth thread section 362c are formed on a first thread portion 36c of the second housing 30c and are not connected with each other. Two orifices 351c are oppositely and radially formed on the second thread portion 36c. Each of the orifices 351c are arranged between the third and fourth thread sections 361c, 362c so as to separate the thread section 361c from the fourth thread section 362c. For more debris-resistant water flow, the first and third thread sections 261c, 361c are formed of round threads, such as Knuckle threads or Edison threads. The first and third thread sections 261c, 361c are formed of double threads having the same pitch as the second and fourth thread sections 361c, 362c.

It should be apparent that a loose fitting thread connection between the first and second housings forms a spiral passage, creating an impeding flow path to adjust the water flow. On the other hand, a tight fitting thread connection part between the first and second housings enables secure engagement of the two housings. In addition, the first and second thread portions are defined a diameter being tapered off, user is able to adjust dimensions of the spiral passage by rotating the first housing relative to second housings.

The preceding description is meant to be illustrative of preferred embodiments and should not be construed as limiting the scope of the present invention. Various modifications, which would be readily apparent to one skilled in the art, are intended to be within the scope of the present invention. Accordingly, the only limitations to the scope of the present invention are set forth in the following claims appended hereto.

What is claimed is:

1. A flow emitter comprising:
   a first housing including a first thread portion and an interior thread axle; the first thread portion including a first thread section and a second thread section;
   a second housing including a second thread portion and an interior thread bore engaged with the interior thread axle of the first housing; the second thread portion including a third thread section corresponding with the first thread section of the first thread portion of the first housing, and a fourth thread section corresponding with the second thread section of the first thread portion of the first housing; the second housing connecting the first housing while the fourth thread section of the second thread portion of the second housing engaging with the second thread section of the first thread portion of the first housing;
   a spiral passage defined between the third thread section of the second thread portion of the second housing and the first thread section of the first thread portion of the first housing, the spiral passage being formed between the interior thread bore and the interior thread axle;
   a first passage formed on the first housing and communicating with the spiral passage; and
   a second passage formed on the second housing and communicating with the spiral passage, so that communication between the first passage and the second passage occurs through the spiral passage;
   wherein the interior thread axle of the first housing defines a diameter and the diameter of the interior thread axle of the first housing reduces in a direction away from the first passage and tapers off;
   wherein the interior thread bore of the second housing defines a diameter and the diameter of the interior thread bore of the second housing reduces in the direction away from the first passage and tapers off;
   wherein a dimension of the spiral passage is adjusted by rotation of the first housing in a way that the first thread section of the first thread portion of the first housing moves relative to the third thread section of the second thread portion of the second housing, and the second thread section of the first thread portion of the first housing moves relative to the fourth thread section of the second thread portion of the second housing, synchronously.

2. The flow emitter as claimed in claim 1, wherein:

the first housing includes an exterior thread bore, and the interior thread axle is arranged through the exterior thread bore; the second thread section is formed on the exterior thread bore, and the first thread section is formed on the interior thread axle;

the second housing includes an exterior thread axle; the exterior thread axle defines an end; the interior thread bore is formed through the exterior thread axle from the end thereof; the exterior thread axle engages with the exterior thread bore of the first housing; the fourth thread section is formed on the exterior thread axle; the third thread section is formed on the interior thread bore.

3. The flow emitter as claimed in claim 2, wherein the spiral passage is defined by the third thread section of the second housing spaced away from the first thread section of the first housing in a predetermined gap.

4. The flow emitter as claimed in claim 3, wherein the first housing includes an end member, and a circumference member bordering a periphery of the end member; the first passage is formed through the end member, the exterior thread bore is formed from the circumference member towards the end member; the interior thread axle extends from an exterior face of the end member into the exterior thread bore; the second housing includes a flange retaining against the circumference member of the first housing, the exterior thread axle extends from the flange into the exterior thread bore of the first housing.

* * * * *